（12）United States Patent
Xu et al.

(10) Patent No.: US 9,131,800 B2
(45) Date of Patent: Sep. 15, 2015

(54) BABY FORMULA MAKER

(76) Inventors: Xueyuan Xu, Ningbo (CN); Shucheng Xu, Ningbo (CN); Defa Cai, Ningbo (CN)

( * ) Notice: Subject to any disclaimer, the term of this patent is extended or adjusted under 35 U.S.C. 154(b) by 0 days.

(21) Appl. No.: 13/881,374

(22) PCT Filed: Feb. 3, 2012

(86) PCT No.: PCT/CN2012/000140
§ 371 (c)(1),
(2), (4) Date: May 28, 2013

(87) PCT Pub. No.: WO2013/056503
PCT Pub. Date: Apr. 25, 2013

(65) Prior Publication Data
US 2014/0352548 A1      Dec. 4, 2014

(30) Foreign Application Priority Data

Oct. 22, 2011   (CN) ...................... 2011 2 0404845 U

(51) Int. Cl.
| | |
|---|---|
| *A23F 5/00* | (2006.01) |
| *G01F 11/00* | (2006.01) |
| *A47J 31/40* | (2006.01) |
| *A47J 31/56* | (2006.01) |
| *A47J 31/36* | (2006.01) |
| *A47K 5/12* | (2006.01) |

(52) U.S. Cl.
CPC .............. *A47J 31/404* (2013.01); *A47J 31/401* (2013.01); *A47J 31/56* (2013.01); *A47J 31/3614* (2013.01); *A47K 5/1202* (2013.01)

(58) Field of Classification Search
CPC ..... A47J 31/401; A47J 31/3614; A47J 31/20; A47J 31/057; A47J 31/52; A47J 31/56; A47J 31/047; A47J 31/02; A47J 31/005; A47J 31/46; A47J 31/54; A47G 19/14; B65D 85/8043; A23G 9/045; A47K 5/1202; B05B 11/3045
USPC ....... 99/275, 279–282, 285, 287, 288, 289 R, 99/290, 297, 300, 305, 323.3; 222/325, 222/153.09
See application file for complete search history.

(56) References Cited

U.S. PATENT DOCUMENTS 5,344,234 A  *  9/1994  Caveza ......................... 366/192
8,230,774 B1 *  7/2012  Hunte ......................... 99/289 R
(Continued)

FOREIGN PATENT DOCUMENTS

CN          201436955 U   *  4/2010

OTHER PUBLICATIONS

Changjun Zhang, Yunqiu Shan, Intelligent flushing the milk machine, Apr. 14, 2010, Machine Translation of CN201436955U.*

*Primary Examiner* — Dana Ross
*Assistant Examiner* — Hemant Mathew

(57) ABSTRACT

A baby formula maker includes a main body including a base, a housing, and a top cover; an electric motor; a gear assembly; a pivotal cover plate; a baby formula assembly including a baby formula reservoir, a reciprocating screw communicating with a bottom of the baby formula reservoir and operatively driven by the gear assembly, and a pivotal gate in front of the reciprocating screw; an outlet under the pivotal gate; two release mechanisms on both sides of the housing respectively for locking both the baby formula assembly and the cover plate; a hot water assembly including a water reservoir, a heating member, and a pump; a control assembly for controlling the hot water assembly, the motor, and the baby formula assembly, the control assembly including a display and an array of buttons for adjusting settings; and a magnetic assembly.

2 Claims, 8 Drawing Sheets

(56) References Cited

U.S. PATENT DOCUMENTS 8,601,938 B2 * 12/2013 Huber et al. ............... 99/289 R
2002/0014497 A1 * 2/2002 Bardin ............................ 222/63
2005/0238341 A1 * 10/2005 Thaler et al. .................. 392/441
2010/0112152 A1 * 5/2010 Sinnema et al. .............. 426/248

* cited by examiner

BABY FORMULA MAKER

BACKGROUND OF THE INVENTION

1. Field of the Invention

The invention relates to baby formula makers and more particularly to such a baby formula maker for making milk for nursing.

2. Description of Related Art

Typically, newborn babies are nursed for a period of time after birth. Newborn babies are usually nursed with milk made by mixing baby formula and warm water. In detail, water is required to boil and then cool to an appropriate temperature for nursing, the amount of baby formula is required to measure, warm water and baby formula are required to put in a nursing bottle, and the nursing bottle is required to shake to uniformly mix water and baby formula. However, considering newborn babies have to be nursed a number of times a day, it is very inconvenient and time consuming to repeat above baby formula making steps.

China Utility Model Patent Number CN201178987Y discloses a baby formula maker comprises a housing, a baby formula reservoir in the housing, a water and baby formula mixing reservoir in the housing, a heating unit in the housing for heating the water and baby formula mixing reservoir to make baby milk, a discharge unit in the housing for discharging a preset amount of baby formula from the baby formula reservoir to the water and baby formula mixing reservoir, and a baby formula outlet projecting out of the housing. However, different concentrations of baby milk cannot be obtained because only a preset amount of baby formula can be discharged from discharge unit.

China Utility Model Patent Number CN201436955U discloses a baby formula maker comprising a housing, a base on the bottom of the housing, a baby formula reservoir in the housing, a water reservoir in the housing, an electric motor in the housing, a water and baby formula mixing reservoir in the housing, a heating unit in the housing for heating the water and baby formula mixing reservoir to make baby milk, a sterilization unit in the housing for sterilizing the baby milk, a cooling unit in the housing for cooling the hot milk, a control panel on the housing including buttons and switches, and a circuit assembly electrically connected to both the control panel and the motor and including a CPU and a circuit board. A user may manipulate the buttons and switches to precisely make an appropriate amount of baby milk prepared from a desired amount of powder baby formula. However, cleaning of the water reservoir and the baby formula reservoir is inconvenient due to the mounting of the motor on the baby formula reservoir.

Notwithstanding the prior art, the invention is neither taught nor rendered obvious thereby.

SUMMARY OF THE INVENTION

It is therefore one object of the invention to provide a baby formula maker having the advantages of capable of precisely discharging powder baby formula and water for preparing baby milk, easy removal of a baby formula assembly for cleaning and sterilization purposes.

For achieving above and other purposes, the invention provides a baby formula maker comprising a main body comprising a base, a housing, and a top cover; an electric motor disposed in the housing; a gear assembly driven by the electric motor; a cover plate pivotably disposed on the top cover; a baby formula assembly adjacent to the cover plate and comprising a baby formula reservoir, a reciprocating screw communicating with a bottom of the baby formula reservoir and operatively driven by the gear assembly, and a pivotal gate disposed in front of the reciprocating screw; an outlet disposed on the housing under the pivotal gate; two release mechanisms disposed on both sides of the housing respectively for locking both the baby formula assembly and the cover plate; a hot water assembly disposed in the housing and comprising a water reservoir, a heating member for heating water stored in the water reservoir, and a pump; a control assembly for controlling the hot water assembly, the electric motor, and the baby formula assembly, the control assembly comprising a display disposed on the housing, and an array of buttons disposed on the housing for adjusting a plurality of settings; and a magnetic assembly for magnetically interacting on both the pivotal gate and the reciprocating screw so as to close the pivotal gate; wherein in response to a quantity of water having a temperature in a predetermined range being stored in the water reservoir, a clockwise rotation of the reciprocating screw conveys a set volume of powder baby formula from the baby formula reservoir and opens the pivotal gate so as to unload the set volume of powder baby formula from the outlet; and wherein in response to activating the pump, the pump sucks a set volume of water from the water reservoir to the outlet.

Preferably, each of the release mechanisms comprises a first arm, a second arm pivotably secured to the first arm, a bracket secured to the second arm, and a push button disposed on an outer surface of the bracket; wherein the first arm includes first and second end protrusions, the second arm includes a protuberance disposed on the bracket; wherein the baby formula reservoir comprises two opposite projecting members formed on an outer surface; wherein the cover plate comprises two projections on both sides respectively; and wherein a pressing of the push button disengages the second protrusions from the projections and disengages the protuberances from the projecting members respectively.

Preferably, the reciprocating screw comprises a forward ring; wherein the baby formula reservoir comprises a forward channel, an exit formed on a lower portion of the forward channel, a limit sleeve fastened on the forward channel and including an opening aligned with the exit, a forward hole being adjacent to and aligned with the forward ring, a stop member disposed on one side of the opening, and a forward tab stop; and wherein the magnetic assembly comprises a first magnet disposed in the forward ring, a second magnet is disposed in a forward end of the pivotal gate, the first and second magnets being magnetically opposite to attract each other; wherein the exit is closed by an attraction of the first and second magnets when the reciprocating screw is deactivated.

Preferably, the gear assembly comprises a first gear operatively connected to the electric motor, and a second gear meshed with the first gear and releasably disposed on the reciprocating screw; and each of the first and second gears is a bevel gear.

The above and other objects, features and advantages of the invention will become apparent from the following detailed description taken with the accompanying drawings.

DETAILED DESCRIPTION OF THE INVENTION

Figure 1:
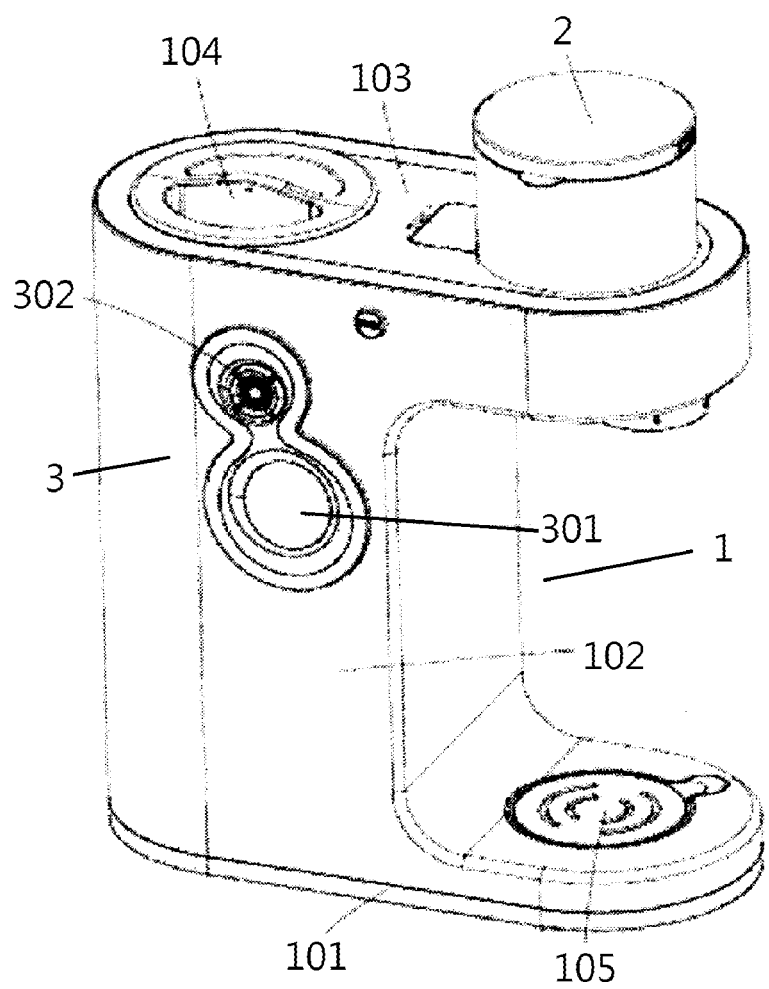
FIG. 1 is a perspective view of a baby formula maker according to the invention.
Figure 2:
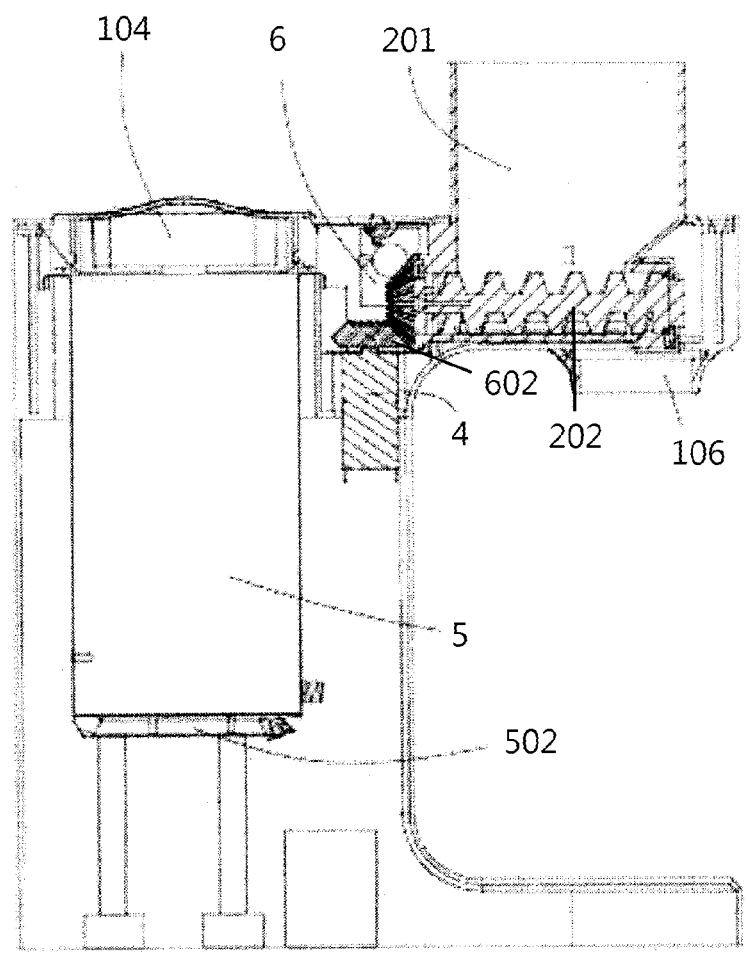
FIG. 2 is a longitudinal sectional view of the baby formula maker.
Figure 3:
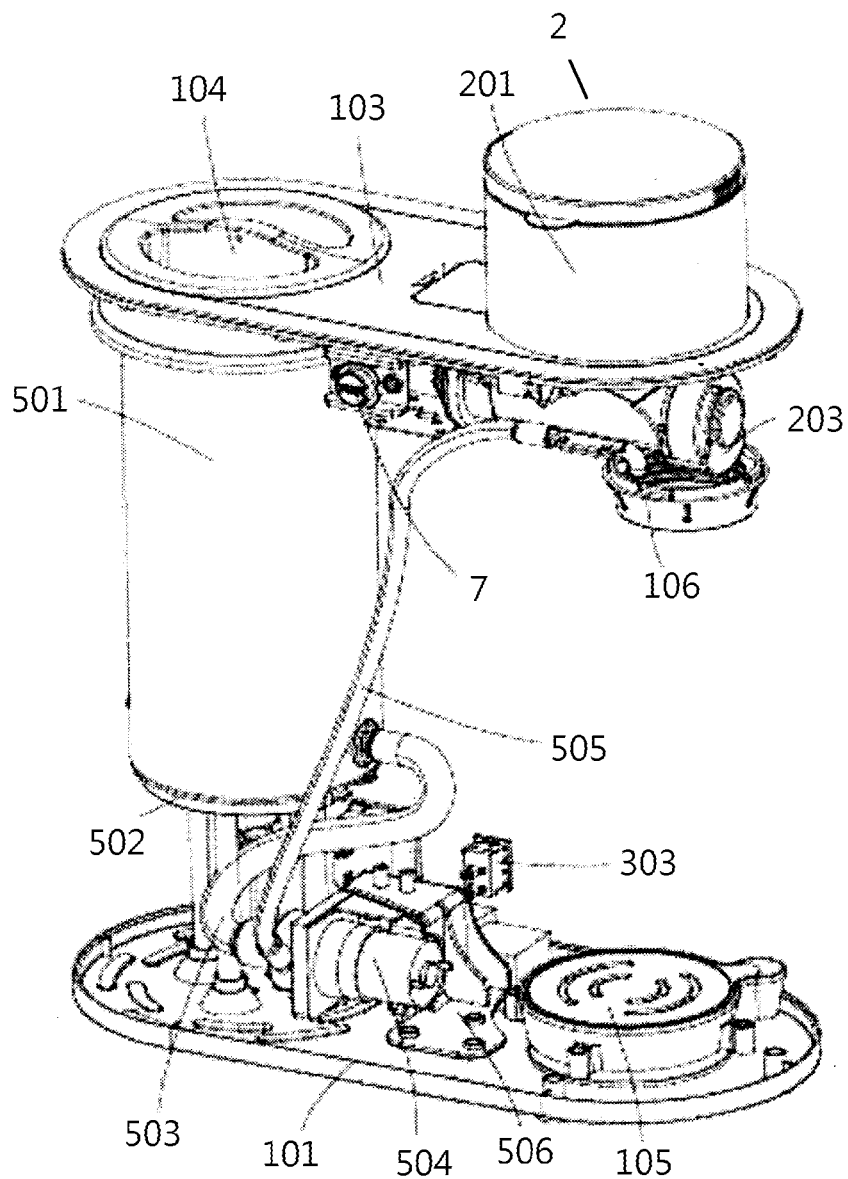
FIG. 3 is a perspective view of the baby formula maker with the housing removed.
Figure 4:
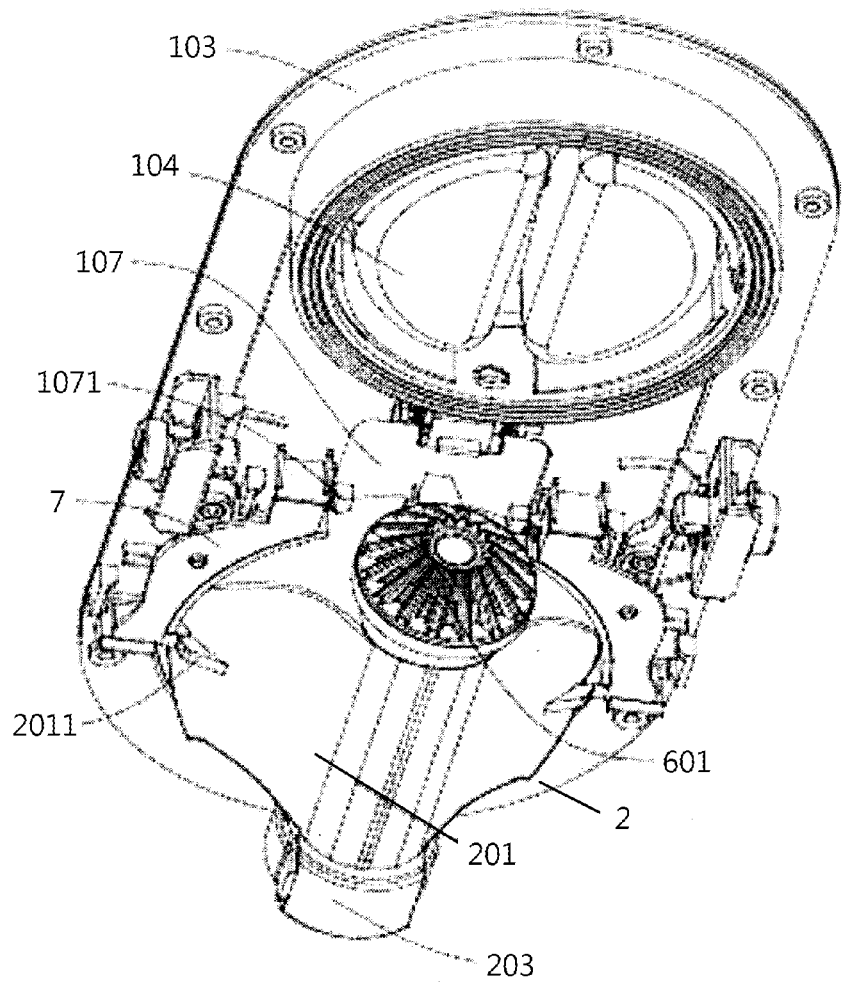
FIG. 4 is a perspective view taken from an underside of an upper portion of FIG. 3 with the water reservoir removed.
Figure 5:
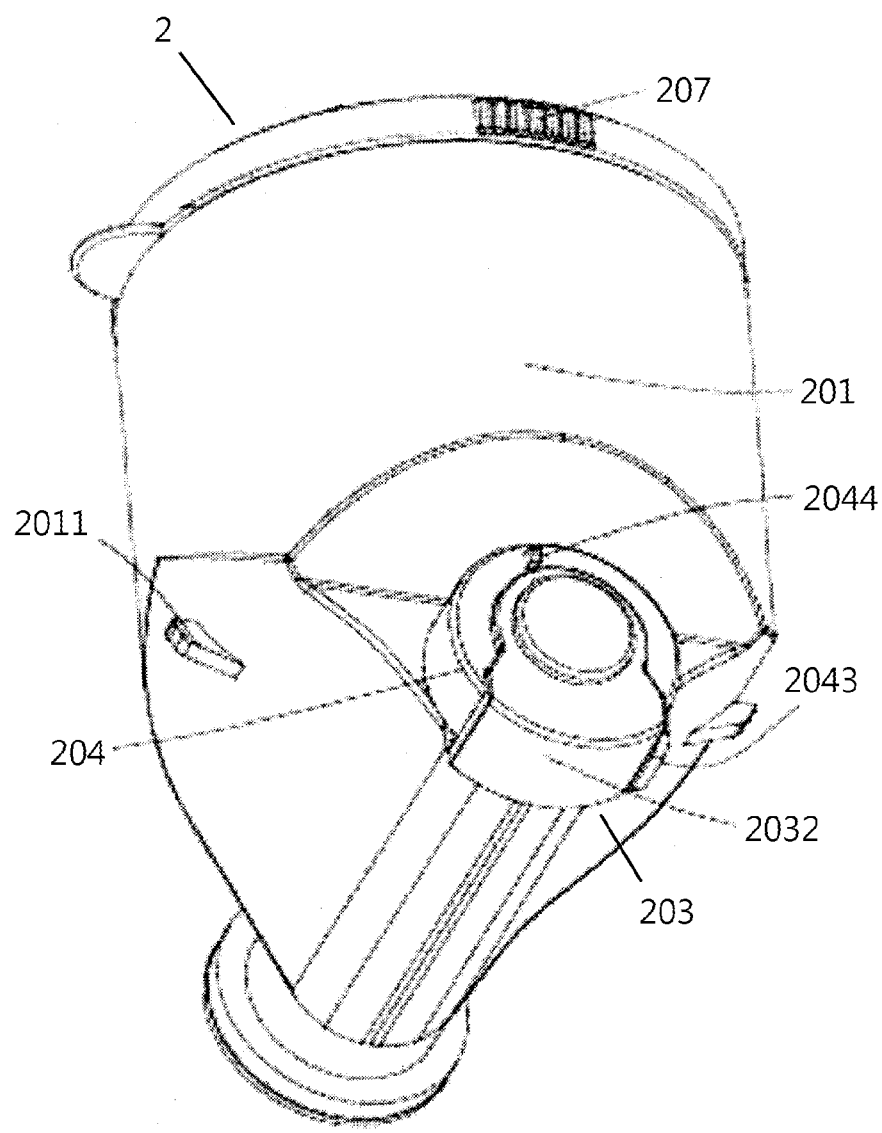
FIG. 5 is a perspective view of the baby formula assembly with the pivotal gate being closed.
Figure 6:
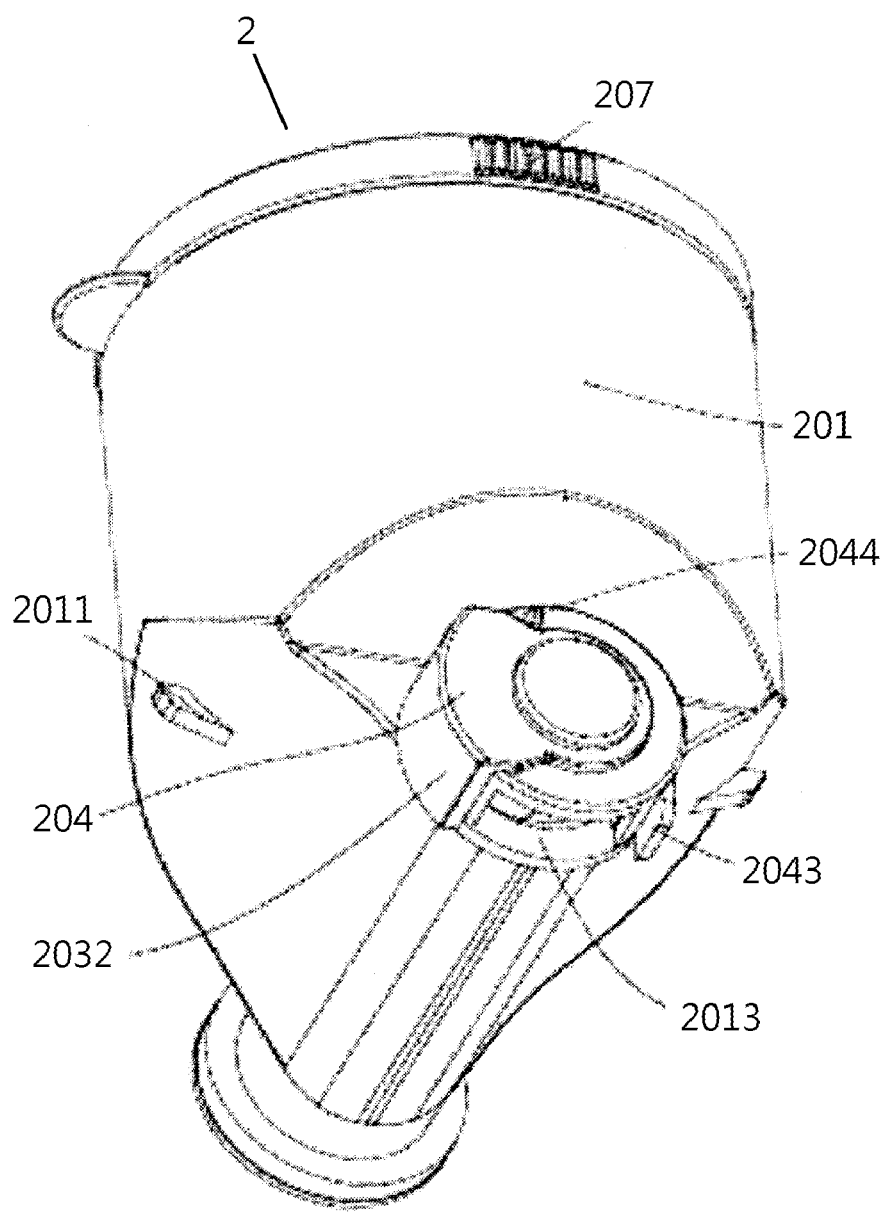
FIG. 6 is a view similar to FIG. 5 with the pivotal gate being open being open.
Figure 7:
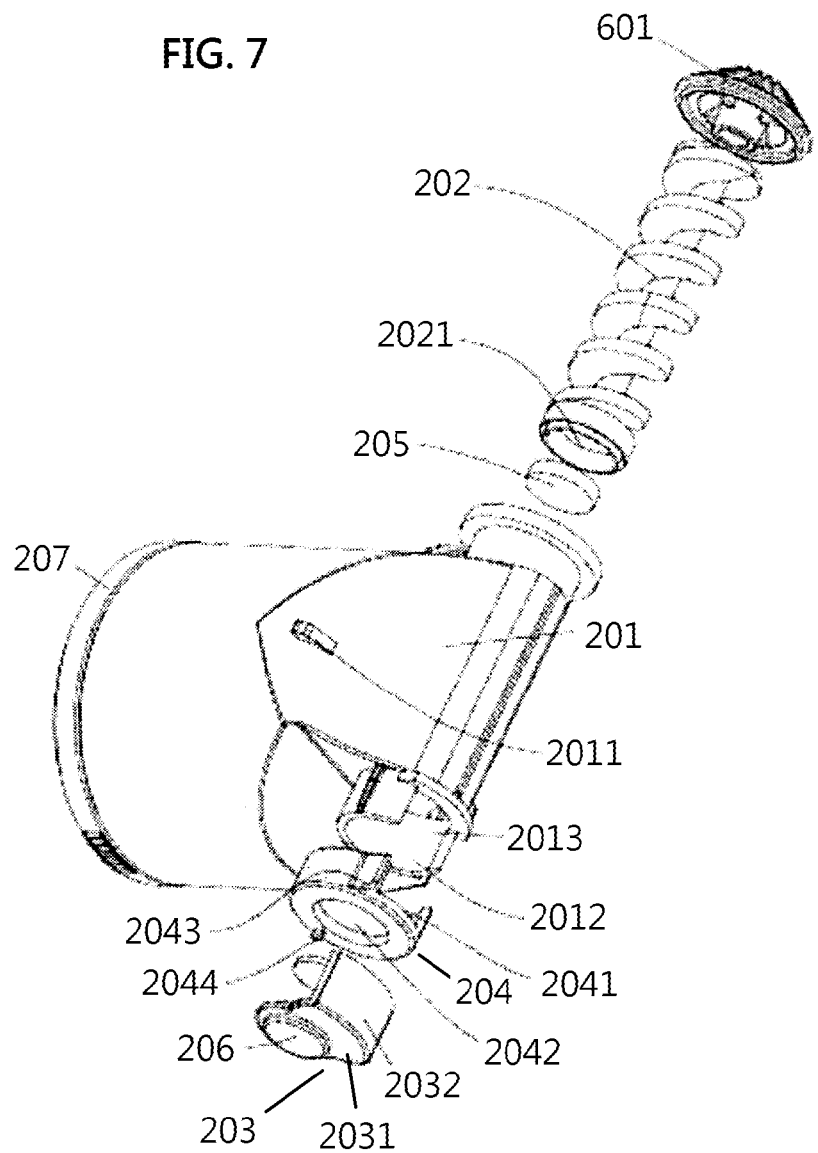
FIG. 7 is an exploded view of the baby formula assembly.
Figure 8:
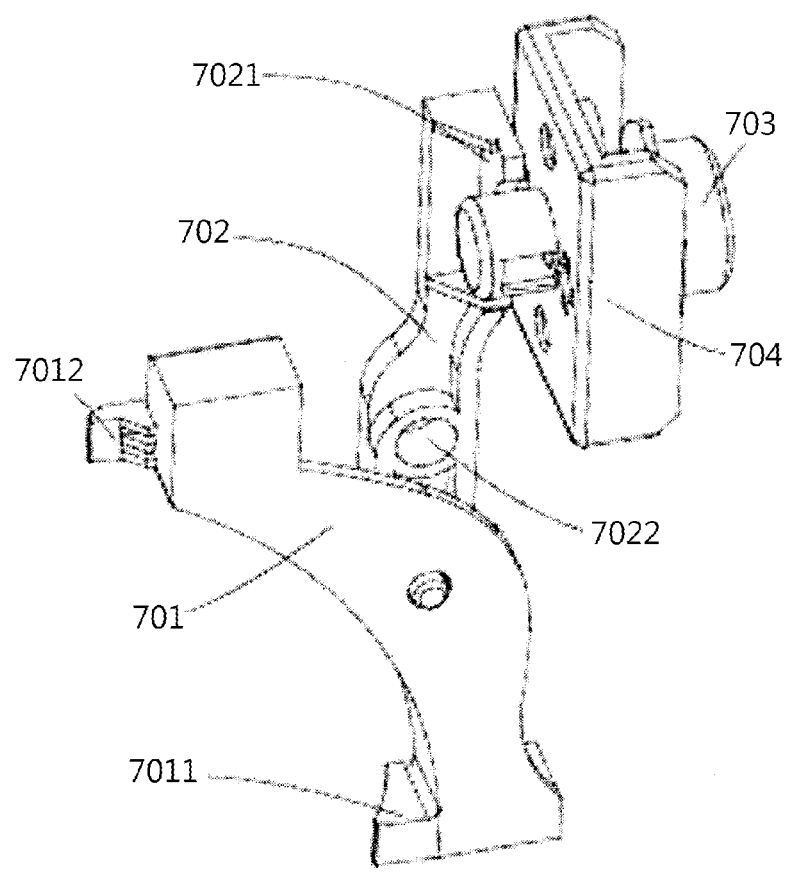
FIG. 8 is a perspective view of the release mechanism.

Referring to FIGS. 1 to 8, a baby formula maker in accordance with the invention comprises the following components as discussed in detail below.

A C-shaped main body 1 comprises a base 101, a housing 102, and a cover 103 on top. A hot water assembly 5 is provided in the housing 102. An upper electric motor 4 is provided in the housing 102 in front of the hot water assembly 5. Two release mechanisms 7 are provided on both sides of the housing 102 respectively. A baby formula assembly 2 is provided on a front portion of the cover 103.

A gear assembly 6 comprises a first gear 602 provided on a driving shaft of the motor 4, and a second gear 601 meshed with the first gear 602 and releasably provided on a reciprocating screw 202 of the baby formula assembly 2 as detailed later. The gear assembly 6 is implemented as bevel gears.

The hot water assembly 5 comprises an upright water reservoir 501 supported by four uprights 4 on top of the base 101, a heating member 502 on an underside of the water reservoir 501, a first pipe 503 having one end connected to a lower portion of the water reservoir 501, a pump 504 supported by a mount 506 on the base 10 and communicating with the other end of the first pipe 503, a second pipe 505 having one end in fluid communication with the pump 504. A cap 104 is provided on top of the water reservoir 501. An outlet 106 is provided on the underside of the baby formula assembly 2 and is in fluid communication with the other end of the second pipe 505. A support 105 is on a front portion of the top of the base 101. The support 105 is directly under the outlet 106 by a distance sufficiently enough to place a milk bottle on the support 105.

A circular opening is provided on a front portion of the cover 103. A rectangular opening is provided in a rear end of the circular opening. A cover plate 107 is pivotably disposed on the rectangular opening. Two projections 1071 are provided on both sides of a bottom of the cover plate 107 respectively and are distal the baby formula assembly 2 mounted in the circular opening. The release mechanism 7 comprises a first arm 701, a second arm 702 pivotably secured to the first arm 701, a bracket 704 secured to the second arm 702, and a push button 703 disposed on an outer surface of the bracket 704. The first arm 701 has a first protrusion 7011 at one end and a second protrusion 7012 at the other end. The second arm 702 includes a pivot 7022 for pivotably securing the second arm 702 to the cover 103 and a protuberance 7021 on the bracket 704. Thus, a pressing of the push button 703 may pivot the second arm 702 about the pivot 7022 and in turn the first arm 701 pivots to cause the first and second protrusions 7011 to disengage from the baby formula assembly 2 and the cover plate 7 respectively as detailed later.

The baby formula assembly 2 comprises a baby formula reservoir 201, the lower reciprocating screw 202 communicating with bottom of the baby formula reservoir 201 and having one end releasably fastened in the second gear 601, and a pivotal gate 203. The baby formula reservoir 201 is cylindrical and has a tapered lower portion to form a bottom ridge with a main portion of the reciprocating screw 202 disposed therein. Two projecting members 2011 are formed on two surfaces of the tapered lower portion of the baby formula reservoir 201. An other end of the reciprocating screw 202 projects forward out of a forward channel 2012 of the baby formula reservoir 201. An exit 2013 is formed on a lower portion of the channel 2012. A limit sleeve 204 is fastened on the channel 2012. An opening 2041 is formed on the limit sleeve 204 and aligned with the exit 2013. The limit sleeve 204 has a forward hole 2042 adjacent to and aligned with a forward ring 2021 of the reciprocating screw 202. A stop member 2043 is provided on one side of the opening 2041. A tab stop 2044 is provided on a forward end of the limit sleeve 204.

The gate 203 comprises a bifurcated, curved member 2032 adapted to cover the opening 2041 of the limit sleeve 204. A disc shaped first magnet 205 is provided in the ring 2021. A disc shaped second magnet 206 is provided in a forward end 2031 of the gate 203. The first and second magnets 205 and 206 are magnetically opposite such as the first magnet 205 being a south magnetic pole and the second magnet 206 being a north magnetic pole or vice versa. Thus, the first and second magnets 205 and 206 can attract each other. The exit 2013 is closed in an inoperative state of the reciprocating screw 202 due to the magnetic attraction of the first and second magnets 205 and 206.

The hot water assembly 5 and the baby formula assembly 2 are controlled by a control assembly 3 comprising a circuit (not shown), a display 301 on the housing 102, an array of buttons 302 on the housing 102 beside the display 301, and an on/off switch 303 on the housing 102. An individual may press one or more buttons of the array of buttons 302 for adjusting various settings such as water temperature, volume of powder baby formula, and volume of water used for mixing with the powder baby formula.

Operation of the invention will be described in detail below. First, a user may open the cap 104 to pour water into the water reservoir 501. Next, the user may open a cap 207 to pour powder baby formula into the baby formula reservoir 201. Next, the user may turn on the on/off switch 303 to activate the motor 4 and initialize the settings of the array of buttons 302. Next, the user may press one or more buttons of the array of buttons 302 for adjusting various settings including desired water temperature for preparing baby milk, volume of powder baby formula, and volume of water used for mixing with the powder baby formula. At the same time, water in the water reservoir 501 is heated. The user is advised to wait until water in the water reservoir 501 is boiled and cooled to the set water temperature prior to preparing baby milk due to safety concerns and prevention nutrient contents of the baby formula from being lost in hot water. Additionally, the user may maintain the desired temperature of water for a prolonged period of time in the night by setting.

Next, the reciprocating screw 202, activated by the motor 4, clockwise rotates to convey powder baby formula fed from the baby formula reservoir 201 according to the set volume of powder baby formula. And in turn, the first magnet 205 rotates. Further, the gate 203 clockwise rotates to open the exit 2013 for unloading powder baby formula into a milk bottle (not shown) via the outlet 106. The reciprocating screw 202 stops rotation when the gate 203 contacts the tab stop 2044. After unloading the set volume of powder baby formula, the reciprocating screw 202 counterclockwise rotates until being stopped by the stop member 2043. As a result, the exit 2013 is closed again. The closing of the exit 2013 is reliable due to the magnetic attraction of the first and second magnets 205 and 206. Next, the user may press a button of the array of buttons 302 to activate the pump 504. And in turn, the pumps 504, instructed by a signal representing the set volume of water, sucks water from the water reservoir 501 to the outlet 106 via the first pipe 503, the pump 504, and the second pipe 505. As a result, an optimum volume of water of the desired temperature pours into the milk bottom from the outlet 106. The user may use a spoon to agitate the baby formula solved in the water for a full mixing of the water and the baby formula. As a result, a quantity of optimum baby milk is prepared.

For removing the baby formula assembly 2, the user may press the push buttons 703 to pivot the first and second arms 701 and 70 toward each other. And in turn, the second protrusions 7012 disengage from the projections 1071 and the protuberances 7021 disengage from the projecting members 2011 respectively. As a result, the baby formula assembly 2 can be removed for cleaning.

While the invention has been described in terms of preferred embodiments, those skilled in the art will recognize that the invention can be practiced with modifications within the spirit and scope of the appended claims.

What is claimed is:

1. A baby formula maker comprising:
a main body comprising a base, a housing, and a top cover;
an electric motor disposed in the housing;
a gear assembly driven by the electric motor;
a cover plate pivotably disposed on the top cover and comprising a first projection on a first side and a second projection on a second side respectively;
a baby formula assembly adjacent to the cover plate and comprising a baby formula reservoir, a reciprocating screw communicating with a bottom of the baby formula reservoir and operatively driven by the gear assembly, and a pivotal gate disposed in front of the reciprocating screw wherein the baby formula reservoir includes opposite first and second projecting members formed on an outer surface;
an outlet disposed on the housing under the pivotal gate;
a first release mechanism disposed on a first side of the housing for locking both the baby formula assembly and the cover plate wherein the first release mechanism comprises a first arm, a second arm pivotably secured to the first arm, a first bracket secured to the second arm, and a first push button disposed on an outer surface of the first bracket; wherein the first arm includes first and second end protrusions, and the second arm includes a protuberance disposed on the first bracket;
a second release mechanism disposed on a second side of the housing for locking both the baby formula assembly and the cover plate wherein the second release mechanism comprises a first arm, a second arm pivotably secured to the first arm of the second release mechanism, a second bracket secured to the second arm of the second release mechanism, and a second push button disposed on an outer surface of the second bracket; wherein the first arm of the second release mechanism includes first and second end protrusions, and the second arm of the second release mechanism includes a protuberance disposed on the second bracket;
a hot water assembly disposed in the housing and comprising a water reservoir, a heating member for heating water stored in the water reservoir, and a pump;
a control assembly for controlling the hot water assembly, the electric motor, and the baby formula assembly, the control assembly comprising a display disposed on the housing, and an array of buttons disposed on the housing for adjusting a plurality of settings; and
a magnetic assembly for magnetically interacting on both the pivotal gate and the reciprocating screw so as to close the pivotal gate;
wherein in response to a quantity of water having a temperature in a predetermined range being stored in the water reservoir, a clockwise rotation of the reciprocating screw conveys a set volume of powder baby formula from the baby formula reservoir and opens the pivotal gate so as to unload the set volume of powder baby formula from the outlet; and
wherein in response to activating the pump, the pump sucks a set volume of water from the water reservoir to the outlet.

2. The baby formula maker of claim 1, wherein a pressing of the first push button disengages the second end protrusion of the first arm of the first release mechanism from the first projection and disengages the protuberance of the second arm of the first release mechanism from the first projecting member respectively; and wherein a pressing of the second push button disengages the second end protrusion of the first arm of the second release mechanism from the second projection and disengages the protuberance of the second arm of the second release mechanism from the second projecting member respectively.

* * * * *